Feb. 20, 1923.

W. B. LASKEY

METHOD OF MAKING CANDY

Filed Apr. 19, 1921

1,446,189

INVENTOR:
William B. Laskey
by Macleod, Calver, Copeland & Dike
ATTYS.

Patented Feb. 20, 1923.

1,446,189

UNITED STATES PATENT OFFICE.

WILLIAM B. LASKEY, OF MARBLEHEAD, MASSACHUSETTS.

METHOD OF MAKING CANDY.

Application filed April 19, 1921. Serial No. 462,734.

*To all whom it may concern:*

Be it known that I, WILLIAM B. LASKEY, a citizen of the United States, residing at Marblehead, county of Essex, State of Massachusetts, have invented a certain new and useful Improved Method of Making Candy, of which the following is a specification, reference being had therein to the accompanying drawings:

My invention has for its object a new and improved method of making pieces of candy such as lozenges, wafers, and the like, and particularly pieces of this kind which have a hole in the centre and which have heretofore been manufactured by dieing them out of a flat sheet of material or by compressing the material in dies or molds. The particular object of the invention is to form pieces of this general character with great rapidity and therefore at relatively small expense.

The novel method herein described is primarily intended for the manufacture of small disks having a hole in the centre, but it is not limited to use in the manufacture of circular pieces, since it may be used in the manufacture of square or pieces of other shape, either with or without a hole in the centre of the piece.

The invention will be fully understood from the following description when taken in connection with the accompanying drawings, and the novel features thereof will be pointed out and clearly defined in the claims at the close of this specification.

In the drawings, Fig. 1 is a plan view of the piece of candy to be produced by the method described herein.

It will be understood that while I have shown in the accompanying drawings mechanism for practising my hereindescribed novel method, I do not limit myself to the use of this particular mechanism, as it will be understood that the invention may be practised by the use of other machines.

Figure 1:
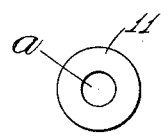

The piece of candy 11 to be made by the method herein described, as shown in Figure 1, is circular in plan view with a hole $a$ in its centre. To make this candy, I cause a tubular length 12 to be extruded through a die 13 secured in a cylinder 14 in which operates a piston 15. At 16 is shown an air passage leading to the centre member 17 of the die, preferably supplied with air under pressure slightly in excess of atmospheric pressure through a pipe 18. This very slight excess of air in the tube prevents the tube collapsing as it comes through the machine but will not be sufficient to cause any distortion of the tube.

Figure 3:
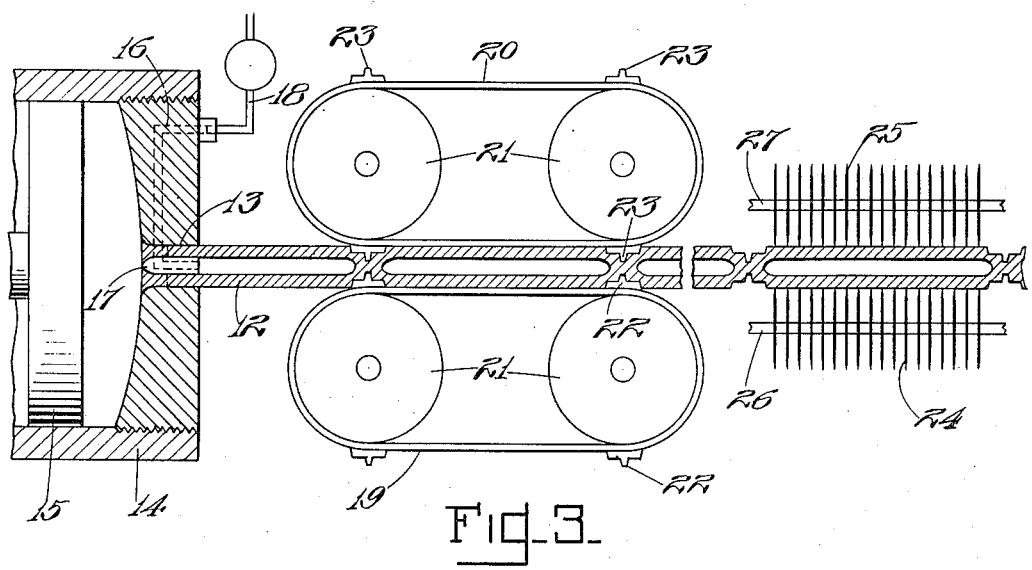
Figure 3 is a side elevation, partly in section, of a machine by means of which the method embodying my invention may be practised.
Figure 2:
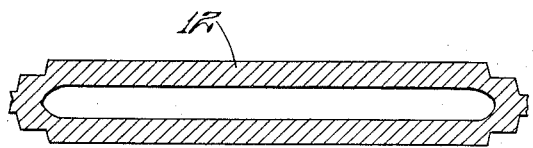
Fig. 2 is a longitudinal section of the tube which is produced by one step in the manufacture of the piece of candy shown in Figure 1.

After being extruded from the die, the tube 12 passes between two conveyors 19 and 20 which, in the form shown in the drawings, consist of endless belts running over wheels 21. The proximate faces of these two belts or conveyors travel in the same direction and both are provided with teeth 22 and 23 so located on the respective conveyors as to pinch the tube between them at suitable intervals. The teeth 22 and 23 are preferably shaped as shown in the drawings so that they will not merely sever the tube, but will also seal it adjacent the point where the tube has been compressed, as shown in the drawings. Each section of the tube produced by this machine will have the form shown in Figure 2: that is, will be tubular in structure but will be sealed on the ends, thereby retaining the air under pressure in the bore. From the conveyors, the sections 12 are fed into the cutting mechanism, being broken away from the next section owing to the fact that sufficient hardening takes place to render the thin portion which connects two approximate sections very brittle.

Figure 4:
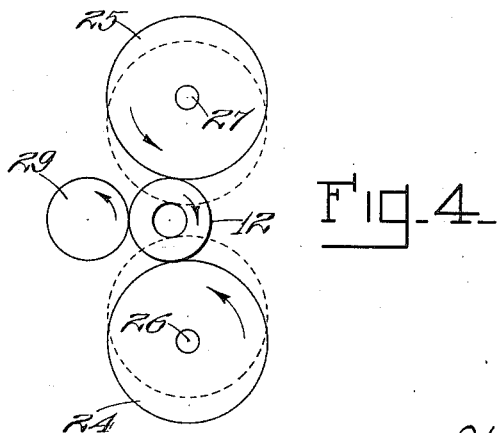
Fig. 4 is a diagram of the cutting mechanism forming part of Figure 3.

The sections are then cut up into individual pieces by two gangs of revolving knives 24 and 25 mounted on axles 26 and 27. These gangs of saws move in toward each other and rotate in opposite directions so that the tube of candy revolves, as indicated by the arrows in Figure 4, being held during the operation by a guide roll 29. It will therefore be seen that the air in the tube is retained in it until the sawing is practically completed and therefore, even though the candy is slightly soft, the tube retains its shape during the sawing operation.

What I claim is—

1. The process of making candy which consists in forming a tube and then cutting the tube while in distended condition transversely of its axis.

2. The method of making candy which consists in forming a tube having closed ends and thereafter cutting said tube transversely of its axis.

3. The method of making candy which consists in forming a tube having closed ends and cutting said tube transversely of its axis at one or more points between said ends.

4. The method of making candy which consists in forming a tube having closed ends and cutting said tube transversely of its axis simultaneously at a plurality of points between said ends.

5. The method of making candy which consists in forming a continuous length of tube, compressing the walls of the tube at intervals to form tubular sections the ends of which are closed and then cutting the sections transversely of their length.

6. The method of making candy which consists in forming a continuous length of tube, compressing the walls of the tube at intervals to form tubular sections the ends of which are closed, and cutting the sections transversely of their length at a plurality of points between said ends.

7. The method of making candy which consists in extruding a continuous tube through a suitable die, compressing the walls of the tube to form tubular sections with closed ends, and then cutting the sections into pieces transversely of their length.

8. The method of making candy which consists in extruding a continuous length of candy through a suitable die, compressing the walls of the tube and simultaneously severing it at the points of compression to form tubular sections having closed ends and then cutting the sections into pieces transversely of their length.

In testimony whereof I affix my signature.

WILLIAM B. LASKEY.